(12) United States Patent
Kim et al.

(10) Patent No.: US 7,010,261 B2
(45) Date of Patent: *Mar. 7, 2006

(54) VOICE BOOK DEVICE AND METHOD OF FORMATION

(75) Inventors: Kyoung-Ho Kim, Kyoungki-do (KR); In-Kil Jeon, Kyoungki-do (KR); Je-Young Oh, Kyoungki-do (KR)

(73) Assignee: SYhitech Co., Ltd., Sungham (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/037,079

(22) Filed: Jan. 19, 2005

(65) Prior Publication Data

US 2005/0123889 A1 Jun. 9, 2005

Related U.S. Application Data

(63) Continuation of application No. 10/142,962, filed on May 13, 2002, now Pat. No. 6,865,367.

(30) Foreign Application Priority Data

Mar. 18, 2002 (KR) ................................. 2002-7907

(51) Int. Cl.
G09B 5/00 (2006.01)

(52) U.S. Cl. ........................ 434/317; 434/308; 40/455; 345/901

(58) Field of Classification Search ................ 434/169, 434/307 R, 308, 311, 317, 319, 322, 350, 434/359, 362, 365; 345/901; 40/455, 457, 40/717; 713/321; 340/568.1; 398/138

See application file for complete search history.

(56) References Cited

U.S. PATENT DOCUMENTS

| | | | |
|---|---|---|---|
| 4,809,246 A | 2/1989 | Jeng |
| 4,884,974 A | 12/1989 | DeSmet |
| 4,990,092 A | 2/1991 | Cummings |
| 5,226,822 A | 7/1993 | Morris |
| 5,396,443 A | 3/1995 | Mese et al. |
| 5,474,457 A | 12/1995 | Bromley |
| 5,484,292 A | 1/1996 | McTaggart |
| 5,520,544 A | 5/1996 | Manico et al. |
| 5,645,432 A | 7/1997 | Jessop |
| 5,748,082 A | 5/1998 | Payne |
| 5,954,514 A | 9/1999 | Haas et al. |
| 6,064,855 A | 5/2000 | Ho |

(Continued)

FOREIGN PATENT DOCUMENTS

EP 0 263 626 A2 4/1988

(Continued)

*Primary Examiner*—Joe H. Cheng
(74) *Attorney, Agent, or Firm*—Dickstein Shapiro Morin & Oshinsky LLP

(57) ABSTRACT

Disclosed herein is a voice book device. The voice book device includes voice book and a book support. The voice book contains various pieces of information. The book support includes a printed circuit board and a housing. The printed circuit board has a storage unit, an optical sensor unit, a decoder unit, a voice output unit, and a control unit. The housing includes the printed circuit board. Each page of the voice book consists of a transparent part and a contents part. An optical reflector is formed on the transparent part and one or more optical sensors are disposed in the book support, and the optical reflectors and the optical sensors are arranged in a one-to-one mapping relationship so that the pages of the voice book are automatically recognized by cooperation operation between the optical reflectors and the optical sensors.

5 Claims, 5 Drawing Sheets

U.S. PATENT DOCUMENTS

| | | |
|---|---|---|
| 6,201,947 B1 | 3/2001 | Hur et al. |
| 6,229,502 B1 | 5/2001 | Schwab |
| 6,297,812 B1 | 10/2001 | Ohara et al. |
| 6,327,459 B1 | 12/2001 | Redford et al. |
| 6,525,706 B1 | 2/2003 | Rehkemper et al. |
| 6,591,526 B1 | 7/2003 | Garrett |
| 6,668,156 B1 | 12/2003 | Lynch et al. |
| 2003/0170603 A1 | 9/2003 | Chen et al. |
| 2004/0202477 A1 * | 10/2004 | Nagasaka et al. ........... 398/138 |

FOREIGN PATENT DOCUMENTS

| | | |
|---|---|---|
| EP | 0609048 A1 | 8/1994 |
| GB | 2121586 A | 12/1983 |
| JP | 2 62464 | 5/1990 |
| KR | 1996 038427 | 12/1998 |
| KR | 1999 021943 | 6/1999 |
| WO | WO 01/01373 A3 | 1/2001 |
| WO | WO 02/084626 A1 | 10/2002 |

* cited by examiner

[Fig. 1]
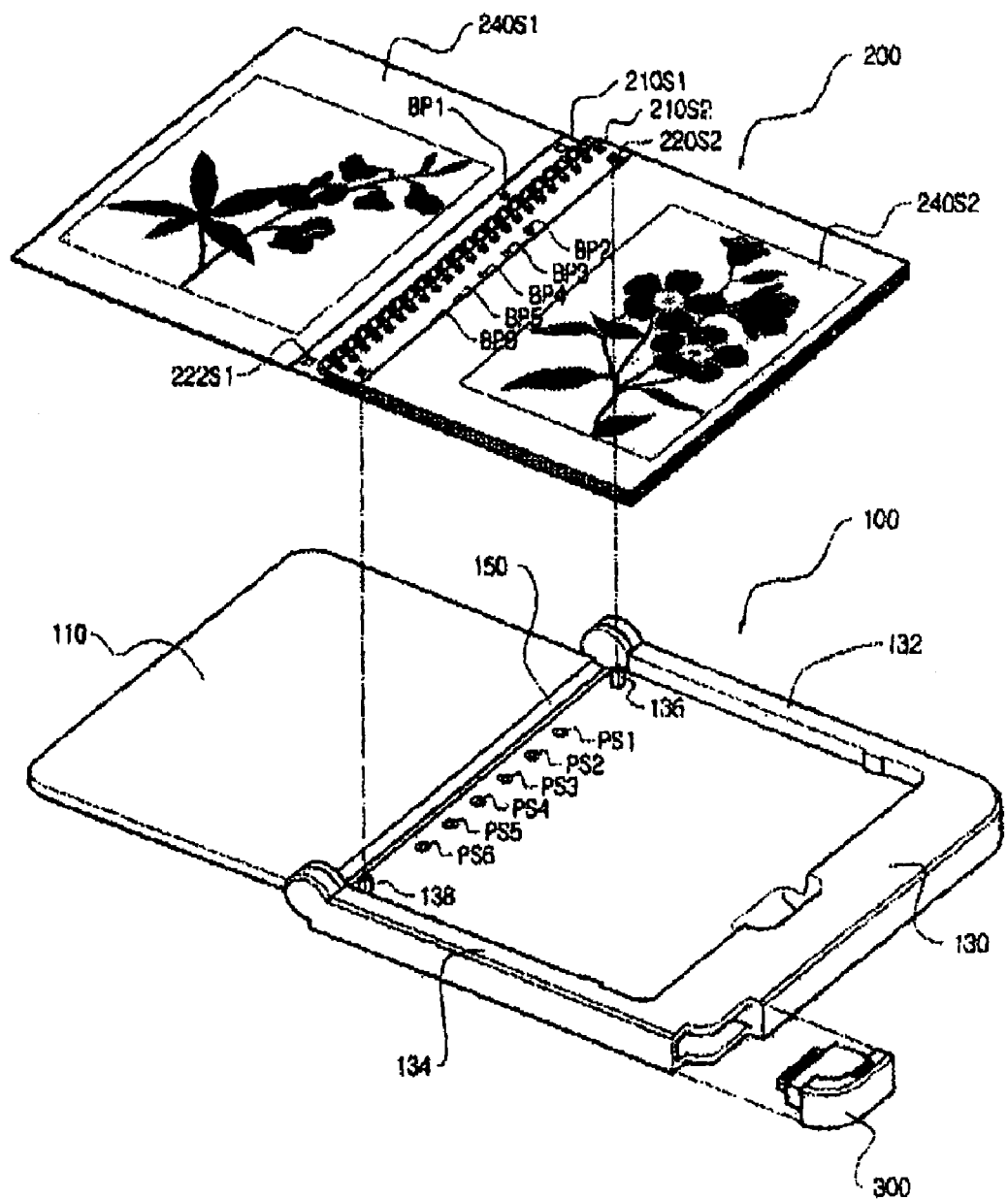

[Fig. 2] PRIOR ART
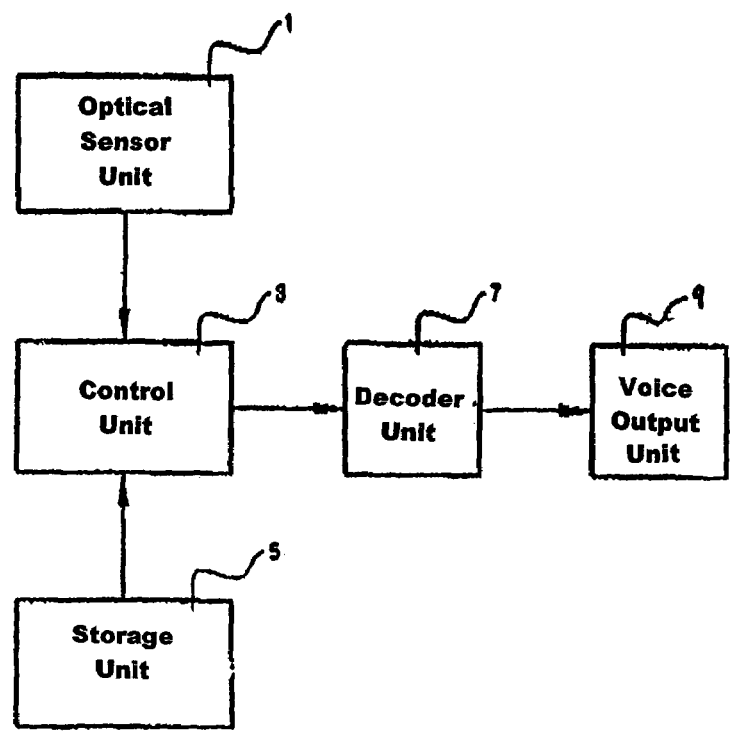
[Fig. 3a]
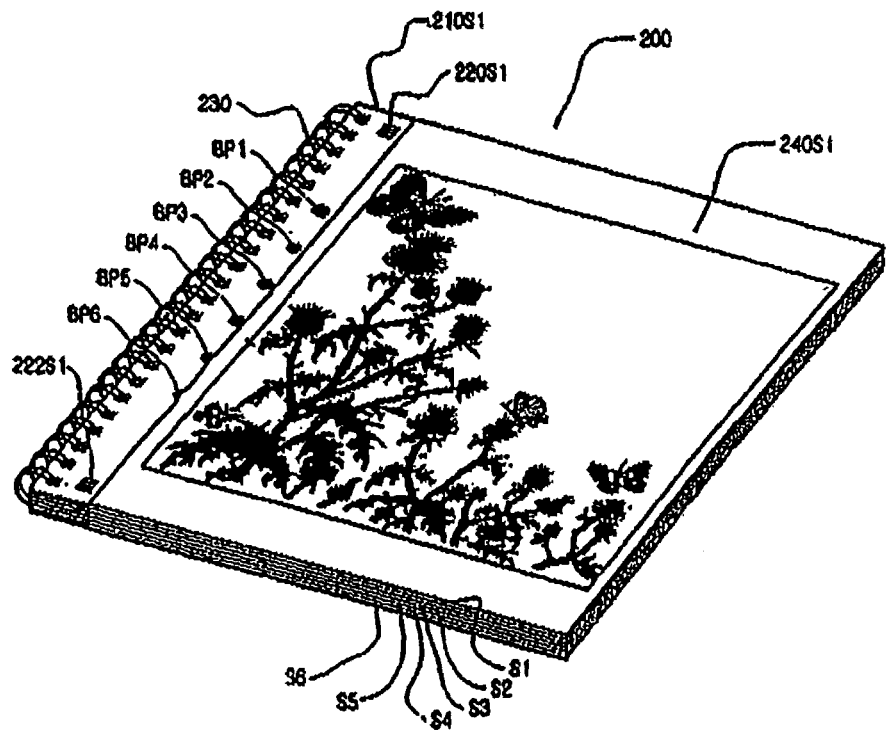

[Fig. 3b]
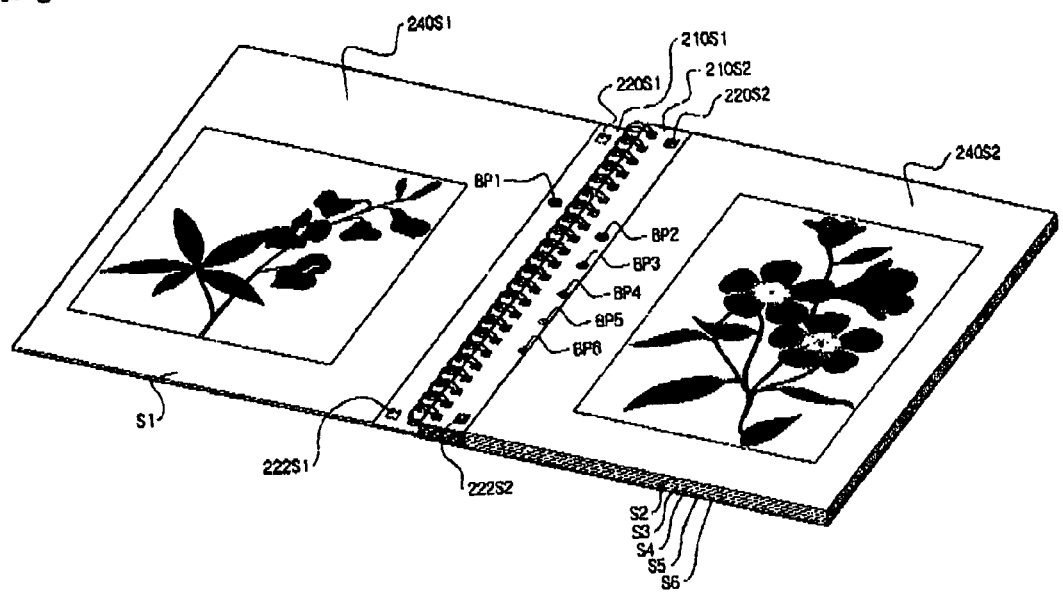
[Fig. 3c]
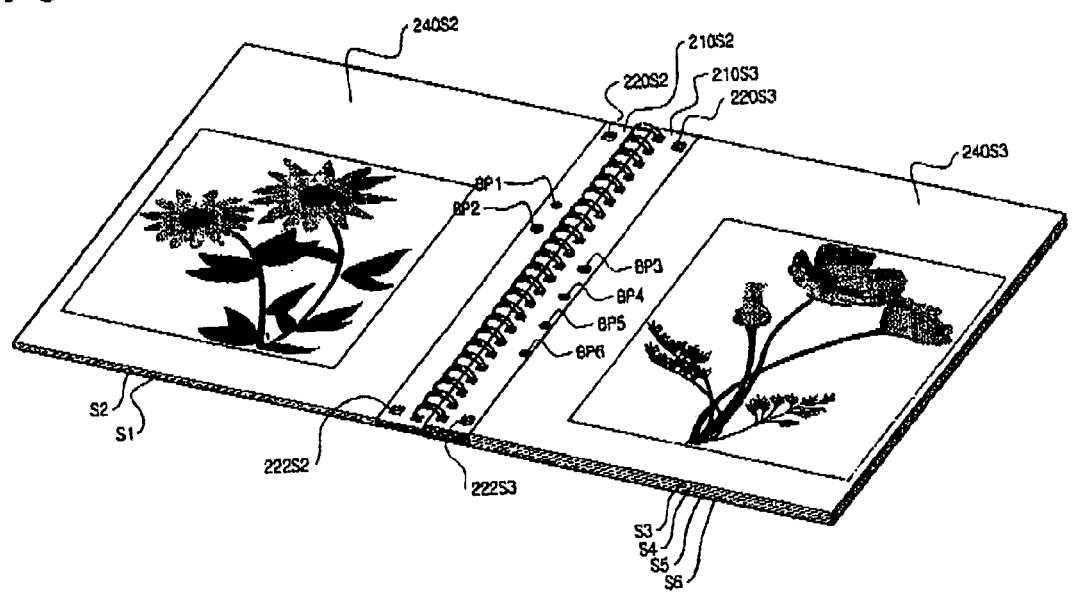

[Fig. 3d]
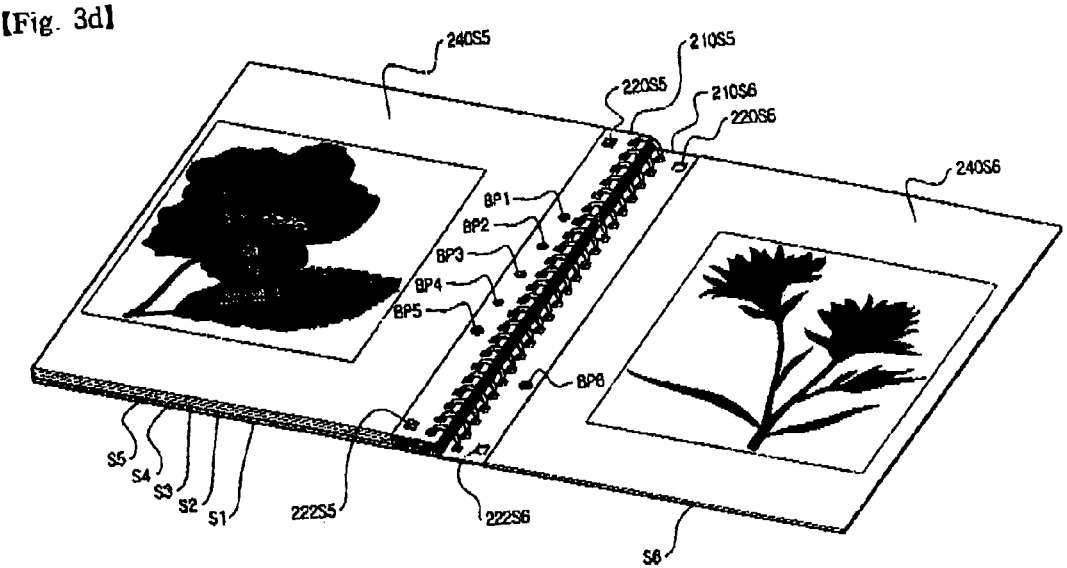
[Fig. 4]
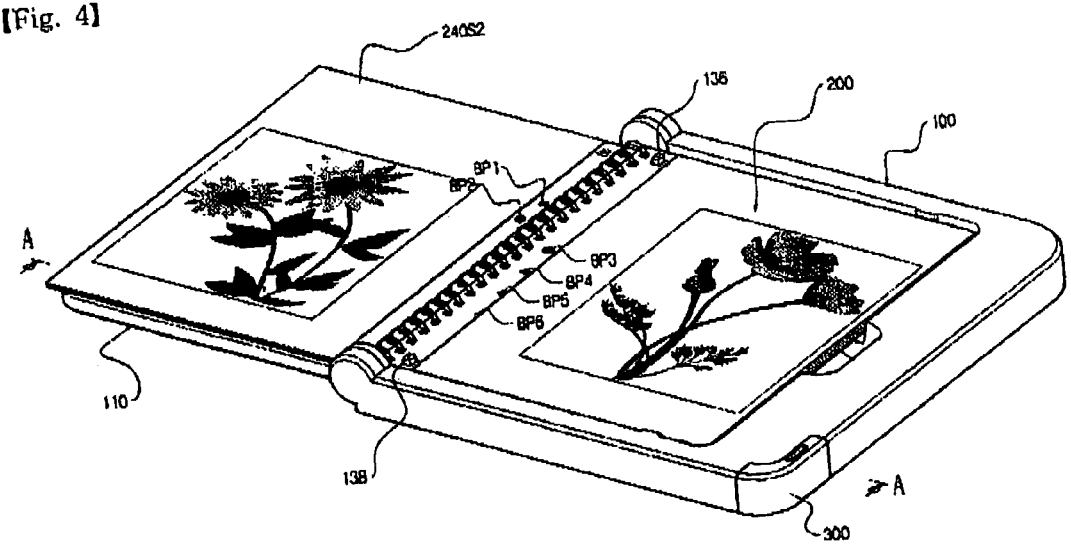

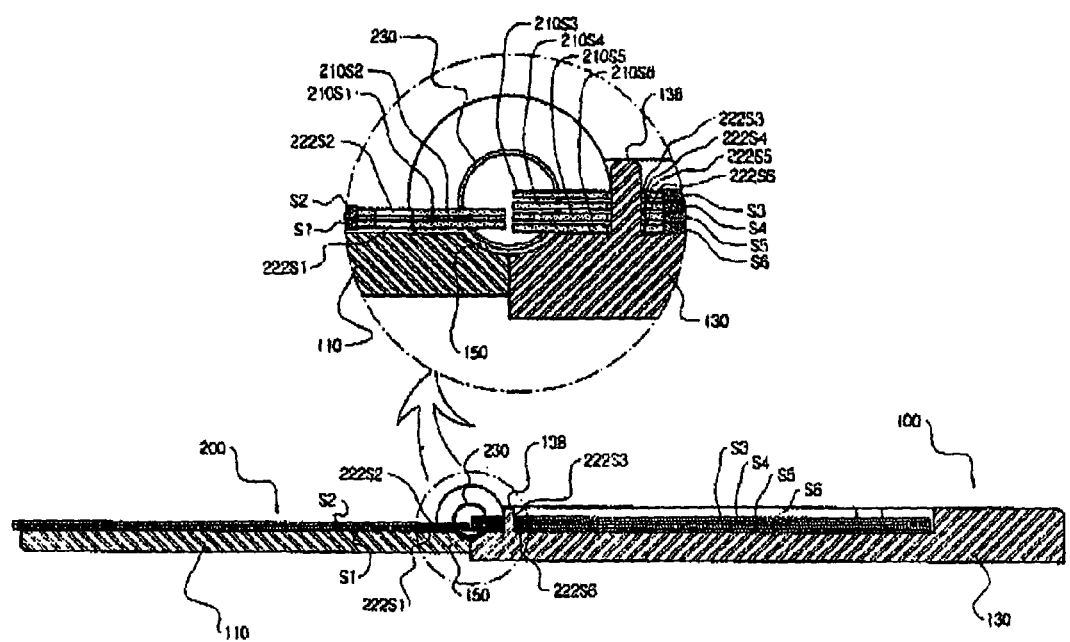
[Fig. 5]

VOICE BOOK DEVICE AND METHOD OF FORMATION

CROSS-REFERENCE TO RELATED APPLICATION

This application is a continuation of U.S. patent application Ser. No. 10/142,962, filed on May 13, 2002, now U.S. Pat. No. 6,865,367 B2, the subject matter of which is incorporated in its entirety by reference herein.

BACKGROUND OF THE INVENTION

1. Field of the Invention

The present invention relates generally to a voice book device for reproducing the contents of a book including sentences and background music, and more particularly to a voice book device, in which each page of a voice book is comprised of a transparent part with one optical reflector and a contents part, thereby eliminating needs for through holes and magnets formed in the voice book.

2. Description of the Prior Art

In general, both pictures and sentences appear on each page of a conventional children's book, so a child associates a picture with a sentence and a parent reads the sentences to him, thereby allowing the child to study language. The conventional children's book is disadvantageous in that a person such as a parent must read the book for a child. In order to overcome such a disadvantage of the conventional children's book, voice books and output devices have been developed. However, conventional voice books and their output devices provide only a simple function of outputting the cry of an animal when a user pushes the animal on a voice book. Japanese Utility Model Laid-open No. Hei2-62464 published on May 10, 1990 discloses a voice book output device that recognizes a corresponding page of a voice book using a bar code reader and plays the voice recording of corresponding sentences. However, it is difficult for a child having low cognitive ability to use the bar code reader. Additionally, Korean Utility Model Laid-open No. 96-38427 published on Dec. 18, 1996 discloses an apparatus in which a plurality of dots are formed on each page of a voice book and a page is recognized by sensing a corresponding dot with a handset having an optical sensor. Korean Utility Model Laid-open No. 96-38427 has the same problem as Japanese Utility Model Laid-open No. Hei2-62464.

Accordingly, there have been developed voice book devices that can automatically recognize their pages without requiring any operation by a child and output the contents of corresponding pages of the books as voice. Korean Utility Model Laid-open No. 1999-21943 published on Jun. 25, 1999 discloses a voice book and output device, in which through holes are formed on the pages of a voice book and optical sensors are mounted on a book support at positions corresponding to the positions of the through holes, and a page recognizing device in which contact switches are mounted on the pages of a voice book and pages are recognized by the on/off operation of a contact switch carried out by the pressure of pages. For the voice book and output device using optical sensors, the through holes must be perforated through each page of the voice book and even through holes of a number corresponding to the number of the last page of the voice book must be formed on the last page, so the voice book is damaged and easily torn, thereby degrading the function of the voice book. For the device using contact switches, contact switches must be mounted on each page of a voice book, so there occur problems that the manufacturing cost of the voice book is increased, the contact switches are easily detached from the pages and the pages are not recognized by the non-operation of the contact switches due to lack of pressure.

Korean Utility Model Laid-open No. 20-178292 discloses a device in which magnets are mounted on each page of a voice book, lead switches are disposed in a book support at positions corresponding to the positions of magnets, and pages are recognized by the cooperation of the magnets and lead switches. For this device, the magnets must be mounted on each page of the voice book, so the manufacturing cost of the device is increased, the magnets are easily detached from the pages and the pages are not recognized by errors in cooperative operation between the magnets and lead switches.

In order to solve such problems, Korean Patent No. 10-317984 discloses a device in which magnets are disposed in each page of a voice book and hall sensors are mounted on a book support, thereby automatically recognizing the pages. However, this device also has problems caused by the disposition of magnets in each page of the voice book.

SUMMARY OF THE INVENTION

Accordingly, the present invention has been made keeping in mind the above problems occurring in the prior art, and an object of the present invention is to provide a voice book device, in which a transparent part with an optical reflector is formed in each page of a voice book and one or more optical sensors are disposed in a book support, so needs for through holes and magnets can be eliminated, thereby preventing the voice book from being damaged and torn to facilitate the maintenance of the voice book, and reducing the manufacturing cost of the voice book device.

Another object of the present invention is to provide a voice book device, which is provided with a positioning means for securing the relative positioning of a voice book and a book support so as to prevent errors in the recognition of pages performed by an optical reflector formed in each page of the voice book and optical sensors disposed in the book support.

In order to accomplish the above object, the present invention provides a voice book device, which comprises a voice book containing various pieces of information, and a book support, comprising a printed circuit board comprised of a storage unit for storing contents of the voice book in the form of digital voice data, an optical sensor unit for recognizing pages of the voice book, a decoder unit for receiving digital voice data stored in the storage unit and demodulating the digital voice data into analog voice signals, a voice output unit for receiving signals outputted from the decoder unit and outputting the signals, and a control unit operated in conjunction with the optical sensor unit to read digital voice data corresponding to desired pages of the voice book from the storage unit and to transmit the digital voice data to the decoder unit, and a housing including the printed circuit board; wherein each page of the voice book is comprised of a transparent part and a contents part; wherein an optical reflector is formed on the transparent part and one or more optical sensors are disposed in the book support, and the optical reflectors and the optical sensors are arranged in a one-to-one mapping relationship so that the pages of the voice book are automatically recognized by cooperation operation between the optical reflectors and the optical sensors.

Preferably, the voice book device further comprises first and second positioning means, the first positioning means being formed on the voice book and the second positioning means being formed on the book support so that the voice book is correctly positioned on the book support to allow the optical reflectors of the voice book to be positioned in a one-to-one mapping relationship with the optical sensors of the book support.

Preferably, the pages of the voice book are bound at one side edge of every page of the voice book by a coil, and a groove is formed across a center of the book support to accommodate the bound portions of the voice book.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view showing a voice book device with a voice book separated from a book support in accordance with the present invention;

FIG. 2 is a block diagram of a well-known drive circuit applied to the book support of the present invention;

FIGS. 3a to 3c are perspective views of the voice book of the present invention;

FIG. 4 is a perspective view showing the voice book device of the present invention with the voice book placed on the book support; and FIG. 5 is a cross section of the voice book device of the present invention taken along line A—A of FIG. 4.

DESCRIPTION OF THE PREFERRED EMBODIMENTS

Reference now should be made to the drawings, in which the same reference numerals are used throughout the different drawings to designate the same or similar components.

FIG. 1 is a perspective view showing a voice book device with a voice book separated from a book support in accordance with the present invention. FIG. 2 is a block diagram showing the circuit of a PCB included in the device support, which is well known to those skilled in the art.

The voice book device is comprised of a voice book 200 and a book support 100. As shown in FIG. 2, the book support 100 has a PCB that includes a drive circuit. The drive circuit generally used in a voice output device is well known, and is comprised of a storage unit 5, an optical sensor unit 1, a decoder unit 7, a voice output unit 9 and a control unit 3.

The storage unit 5 stores the contents of the voice book, and is generally a built-in or portable memory. The optical sensor unit 1 is a means for recognizing the pages of the voice book, and is generally a photoelectric transducer such as a photosensor. There can be employed both a type of sensor having a light emitting element and a light receiving element (which can be used in reflection mode described below) and another type of sensor only having a light receiving element (which can be used in transmission mode). The decoder unit 7 is a means for receiving digital voice data stored in the storage unit 5 and demodulating the digital voice data into analog voice signals. The voice output unit 9 is a means for receiving output signals from the decoder unit 7 and outputting the signals. The control unit 3 serves to control the entire operation of the system including an operation of reading digital voice data corresponding to a page of the voice book from the storage unit 5 and transmitting the digital voice data to the decoder unit 7 in cooperation with the optical sensor unit 1. The control unit 3 is generally implemented as a microcomputer.

The book support 100 is comprised of an upper support plate 110 and a lower support plate 130. Element 300 depicts a plug-in circuit. A construction in which a plurality of optical sensors PS1 to PS6 are arranged on the lower support part 130 to correspond to the number of the pages of the voice book is identical with a corresponding construction disclosed in Korean Utility Model Laid-open No. 1999-21943, so a description of the construction is omitted herein.

In accordance with the present invention, a semi-cylindrical groove 150 is longitudinally formed along folded portions of the upper and lower support plate 110 and 130 at which the upper and lower support plates 110 and 130 are contiguous with each other. A second positioning means is formed on the lower support plate 130 in the shape of protrusions 136 and 138. Stepped portions 132 and 134 are formed along the upper and lower ends of the lower support plate 130. These constructions aid in preventing errors in the positioning of the voice book and the recognition of a page of the voice book that will be described below.

FIGS. 3a to 3d are views showing a voice book in accordance with the present invention. Generally, a voice book 200 is comprised of two front and back outer pages and a plurality of inner pages. In this embodiment, the voice book 200 has a total of six pages S1 to S6, but the voice book 200 of the present invention is not restricted to an above-described number of pages.

The voice book 200 is comprised of pages S1 to S6. Each of the pages S1 to S6 is comprised of a transparent part 210S1 to 210S6 and a contents part 240S1 to 240S6. An optical reflector BP1 to DB6 is disposed on each transparent part 210S1 to 210S6 to correspond to the optical sensors PS1 to PS6. Sentences and pictures are shown on the contents parts 240S1 to 240S6. A first positioning means is formed at the upper and lower portions of each page S1 to S6 of the voice book 200 in the shape of insertion holes 220S1 to 220S6 and 222S1 to 222S6. The pages S1 to S6 of the voice book 200 are bound by a coil at their edges. In this case, the insertion holes 220S1 to 220S6 and 222S1 to 222S6 do not need to be formed through all the pages S1 to S6, and the first positioning means can have any construction that enables the correct positioning of the voice book (for example, an insertion hole can be formed only in a back page).

The transparent parts 210S1 to 210S6 are formed of any material that allows light to pass therethrough, and, generally, of polyester or polypropylene. The reflectors BP1 to BP6 are made of any material that allows light to be reflected. The reflectors BP1 to BP6 are generally formed by printing white spots in a screen printing or indirect printing method.

When the voice book shown in FIG. 3a is normally placed on the book support 100, six optical reflectors BP1 to BP6 are positioned just over the optical sensors PS1 to PS6 in a one-to-one mapping relationship. In such a case, light emitted from the light emitting elements of all the optical sensor PS to PS6 is reflected by all the optical reflectors BP1 to BP6, the front page S1 is sensed by the-above described circuit, and the contents of the front page S1 are outputted as voice. This case is referred to as "reflection mode". When the front page S1 is turned to cause the first inner page S2 to appear as shown in FIG. 3b, five optical reflectors BP2 to BP6 are positioned in a one-to-one mapping relationship with five optical sensors PS2 to PS6. Accordingly, only light emitted from the five optical sensors PS2 to PS6 of a total of six optical sensors PS1 to PS6 is reflected by the five optical reflectors BP2 to BP6, reflected light is sent back to the five optical sensors PS2 to PS6, and the first inner page S2 is sensed by the above-described circuit. When the first inner page S2 is turned to cause the second inner page S3 to appear as shown in FIG. 3c, four optical reflectors BP3 to BP6 are positioned in a one-to-one mapping relationship with four optical sensors PS3 to PS6. Accordingly, only light emitted from the four optical sensors PS3 to PS6 of a total of six optical sensors PS1 to PS6 is reflected by the optical reflectors BP3 to BP6, reflected light is sent back to the four optical sensors PS3 to PS6, and the second inner page S3 is sensed by the above-described circuit. If there are employed optical sensors having only light receiving elements for sensing outside light, the inventive concept of the present invention can be implemented without hindrance. Referring to FIG. 3a, light sent from the outside is reflected by the optical reflectors BP1 to BP6, thereby preventing the light from entering the optical sensors PS1 to PS6. Accordingly, the front page S1 is sensed and the contents of the front page S1 are outputted as voice. This mode is referred to as "transmission mode". The remaining pages can be sensed in the same way as described above.

Hereinafter, with reference to FIG. 5, a construction for securing the relative positioning of the voice book 200 and the book support 100 is described.

As described above, six pairs of insertion holes 220S1 to 220S6 and 222S1 to 222S2 are formed through the pages of the voice book 200 as the first positioning means, while two protrusions 136 and 138 are formed on the upper and lower portions of the book support 100 as the second positioning means. When the voice book 200 is placed on the book support 100, the protrusions 136 and 138 are inserted into the insertion holes 220S1 to 220S6 and 222S1 to 222S6. Additionally, the neighboring edges of the voice book 100 are bound by the coil 230, and the groove 150 is longitudinally formed along folded portions of the upper and lower support plates 110 and 130. As a result, when the voice book 200 is placed on the book support 100, the coil 230 is positioned in the groove 150. With such a construction, there can be prevented errors in sensing the pages of the voice book 200 that may occur while the voice book 200 is placed on the book support 100. Moreover, in accordance with the present invention, the stepped portions 132 and 134 are formed along the upper and lower ends of the lower support plate 130, so the moving of the voice book 200 can be prevented by the stepped portions 132 and 134.

As described above, the present invention provides a voice book device, in which a transparent part with an optical reflector is formed in each page of a voice book and one or more optical sensors are disposed in a book support, so needs for through holes and magnets can be eliminated, thereby preventing the voice book from being damaged and torn to facilitate the maintenance of the voice book and reducing the manufacturing cost of the voice book device.

In addition, the present invention is to provide a voice book device, which is provided with positioning means for securing the relative positioning of a voice book and a book support, so there can be prevented errors in the recognition of pages.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A page for use in a voice book device, comprising:
at least one transparent part and at least one contents part, wherein at least one optical reflector unit is provided on the at least one transparent part; and
at least one area located on said page used to position said page in a voice book devices,
wherein said voice book device comprises a voice book containing various pieces of information and a book support, said voice book device further comprising:
a printed circuit board comprised of a storage unit for storing contents of the voice book in the form of digital voice data;
an optical sensor unit for recognizing pages of the voice book;
a decoder unit for receiving digital voice data stored in the storage unit and demodulating the digital voice data into analog voice signals;
a voice output unit for receiving signals outputted from the decoder unit and outputting the signals;
a control unit operated in conjunction with the optical sensor unit to read digital voice data corresponding to desired pages of the voice book from the storage unit and to transmit the digital voice data to the decoder unit; and
a housing including the printed circuit board, wherein each page of the voice book is comprised of a transparent part and a contents part, and wherein one or more optical sensors are disposed in the book support, and optical reflectors of said optical reflector unit and the optical sensors of said optical sensor unit are arranged in a one-to-one mapping relationship so that the pages of the voice book are automatically recognized by cooperation operation between the optical reflectors and the optical sensors.

2. The page recited in claim 1, wherein said optical sensors are photoelectric transducers.

3. The page recited in claim 1, wherein said at least one transparent part comprises a polyester or polypropylene material.

4. A method of forming a voice book device with a book support, said method comprising:
providing at least one page for said voice book;
forming said at least one page with at least one transparent part and at least one contents part;
forming at least one optical reflector on said at least one transparent part;
forming at least one optical sensor in said book support of the voice book device; and
arranging said at least one optical reflector and said at least one optical sensor in a one-to-one mapping relationship so that the pages of the voice book are automatically recognized by cooperation operation between the at least one optical reflector and the at least one optical sensor,
providing a printed circuit board with at least one storage unit for storing contents of the voice book in the form of digital voice data;
providing at least one decoder unit for receiving digital voice data stored in the at least one storage unit and demodulating the digital voice data into analog voice signals;
providing at least one voice output unit for receiving the analog voice signals outputted from the at least one decoder unit and outputting the analog voice signals;
providing at least one control unit operated in conjunction with the at least one optical sensor unit to read digital voice data corresponding to pages of the voice book from the at least one storage unit and to transmit the digital voice data to the at least one decoder unit;

wherein said printed circuit board is formed in a housing.

5. The method of claim 4, further comprising:

forming first positioning means on the voice book;

forming second positioning means on the book support; and positioning said voice book on said book support by said first and second positioning means to allow the at least one optical reflector of the voice book to be in a one-to-one mapping relationship with said at least one optical sensor.

* * * * *